United States Patent
Wallenius

(10) Patent No.: US 7,139,813 B1
(45) Date of Patent: Nov. 21, 2006

(54) TIMEDEPENDENT HYPERLINK SYSTEM IN VIDEOCONTENT

(75) Inventor: Jukka Wallenius, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/431,753

(22) Filed: Nov. 1, 1999

(51) Int. Cl.
    G06F 15/16  (2006.01)
(52) U.S. Cl. .................. 709/219; 725/215; 725/22
(58) Field of Classification Search ............... 709/231, 709/227, 245, 228, 203, 219; 725/22, 215
    See application file for complete search history.

(56) References Cited

U.S. PATENT DOCUMENTS

| | | | |
|---|---|---|---|
| 5,572,442 A * | 11/1996 | Schulhof et al. ............ | 364/514 |
| 5,708,845 A | 1/1998 | Wistendahl et al. | |
| 5,774,664 A * | 6/1998 | Hidary et al. ............... | 395/200 |
| 5,918,012 A | 6/1999 | Astiz et al. | |
| 5,961,603 A | 10/1999 | Kunkel et al. | |
| 5,983,262 A * | 11/1999 | Kukkal ....................... | 709/204 |
| 5,996,015 A | 11/1999 | Day et al. | |
| 6,012,086 A | 1/2000 | Lowell | |
| 6,049,831 A * | 4/2000 | Gardell et al. .............. | 709/236 |
| 6,141,693 A * | 10/2000 | Perlman et al. | |
| 6,195,692 B1 * | 2/2001 | Hsu ............................ | 709/219 |
| 6,286,139 B1 * | 9/2001 | Decinque ..................... | 725/5 |
| 6,317,795 B1 * | 11/2001 | Malkin et al. ............... | 709/246 |
| 6,330,595 B1 * | 12/2001 | Ullman et al. .............. | 709/219 |
| 6,357,042 B1 * | 3/2002 | Srinivasan et al. .......... | 725/32 |
| 6,415,327 B1 * | 7/2002 | Beckerman et al. | |

FOREIGN PATENT DOCUMENTS

WO    WO 98/44435    4/1997

OTHER PUBLICATIONS

"Multimedia Hypervideo Links for Full Motion Videos", IBM Technical Disclosure Bulletin. vol. 37, No. 04A, Apr. 1994, p. 95.
XP-000986761 Hyperlinked Video,Jonathan Dakss, Stefan Agamanolis, Edmond Chalom, and V. Michael Bove, Jr. MIT Media Laboratory 20 Ames Street, Cambridge, Massachusetts 02139 USA p. 2-10.
XP-000754600 VideoProxy: A Media and Protocol Converter for Internet Video, Kiyokuni Kawachiya Nagatsugu Yamanouchi Takayuki Kushida IBM Research, Tokyo research Laboratory, 1623-14, Shimotsuruma, Yamato Kanagawa 242 Japan Jan. 10, 1996 p. 541-550.

* cited by examiner

Primary Examiner—Jason Cardone
Assistant Examiner—Adnan M. Mirza
(74) Attorney, Agent, or Firm—Cohen, Pontani, Lieberman & Pavane

(57) ABSTRACT

A time-dependent hyperlink is associated with a video of a content server. The time dependent link is cross-referenced with coordinates and time that it appears in the video. A user may select the time-dependent hyperlink by selecting the hyperlink when is displayed by the video. The coordinates of the selection, including time, are used to determine the hyperlink that was selected. The browser being used can then be switched to a new session indicated by the hyperlink.

64 Claims, 8 Drawing Sheets

TIMEDEPENDENT HYPERLINK SYSTEM IN VIDEOCONTENT

BACKGROUND OF THE INVENTION

1. Field of the Invention

The present invention relates to a hyperlink having a time dependency and related to a video.

2. Description of the Related Art

Hypertext systems, such as the World Wide Web (WWW), contain objects, i.e. electronic documents, which are creatively linked to each other. During a session, a user device is connected via a browser to a content server including an object and content is exchanged between the user device and the content server. The exchange of content occurs over the internet using, for example, a hypertext transport protocol (HTTP) for hypertext documents. The HTTP protocol messages are carried in Transmission Control Protocol/Internet Protocol (TCP/IP) messages. It is also possible to transmit voice or video content over the internet. For the establishment of voice and/or video multimedia session protocols like Session Initiation Protocol (SIP) and H.323 are used. Multimedia sessions can be established via SIP by selecting links from HTTP hypertext documents, if the browser is equipped with multimedia capabilities. SIP is a client-server protocol in which requests are generated by one entity (the user or client) and sent to a receiving entity (the server). Contacting the server of the new object may be accomplished by looking up the domain name of the new server in a Domain Name Service (DNS) and determining the correct IP address. The DNS is actually its own network. If one DNS server does not know how to translate a domain name, it asks another, and so one, until the correct IP address is found. The request from the browser is sent to the IP address and may be redirected to where the actual object is connected. The object returns a response through the chain.

Each object which the user device may access may include one or more hyperlinks that link to another place in the same document or to an entirely different object. The hyperlinks occur within a certain area in the object and may include a picture or phrase, a word, an icon, or any other visual representations. The hyperlinks in these objects may be selected by clicking when the cursor is within the area of the hyperlink. When the hyperlink is selected, the browser of the user device switches over to a new object that is associated with the hyperlink.

Prior art video content include hyperlinks and other WWW type content associated with video programs. However, the hyperlinks and WWW type content that are associated with prior art video content are transmitted in parallel to the video program without being associated directly to spatial objects within the video stream. Therefore, these hyperlinks are not bound to objects in the video. It is desireable to navigate in video/multimedia content using hyperlinks bound to the video content. Similarly, the prior art does not define mechanisms for implementing a seamless switchover between video contents. In the prior art, there is always an observable delay when establishing a new session after a hyperlink has been selected from, e.g., a web page displayed by the side of a television picture.

Furthermore, in the prior art, there are no mechanisms having parallel multimedia streams active for potential switchover periods while retaining only one multimedia stream toward the user device.

SUMMARY OF THE INVENTION

It is an object of the present invention to provide a system in which link information is associated with video such that a user may select a hyperlink in video/multimedia content.

According to the invention, a user of a video browser selects a link displayed with the video while viewing the video. Once the link to a new session is selected, the establishment of a connection to the new session is initiated. The links may be represented by three dimensions including the x and y coordinate ranges of the link at a given moment in time in the video image with the last dimension in each case being time that the link appears during the playing of the video. For example, the video may show a person walking from room to room and the hyperlinks may be associated with different furniture in each of the rooms. Therefore, the hyperlink for a chair in the kitchen is only selectable for the portion of time that the chair is displayed. The link may be to a site containing information about the history of the furniture (i.e. if the furniture is an antique) and/or information about how to buy the furniture. Furthermore, it is conceivable that the hyperlink may be represented in three dimensional space with a fourth dimension being time if the video is in three dimensions.

The link information may be transmitted as a link stream to the video browser parallel to the video information so that the link information is available to the video browser when the link is in effect. In this embodiment the establishment of a connection to a new session is made by the video browser.

The link information may alternatively be stored in the content server in a database with a mapping of time and coordinates to the link information. In this embodiment, the establishment of a connection to a new session may be made by the content server for the video browser.

In another embodiment, a call processing server may be arranged between the content server and the browser. In this embodiment, the call processing server may be used to initiate the establishment of a new session, thereby reducing bandwidth required to the browser. Moreover, a media proxy arrangement may optionally be connected with the call processing server.

In yet another embodiment, the link information may be downloaded to the video browser from the content server at the start of the video session before the video information is transmitted to the video browser from the content server. In this embodiment, the mapping of time and coordinates to the link information occurs in the video browser.

Each of these embodiments may include the advance establishment of a connection to a new session of an approaching hyperlink to provide a smooth switchover to the new session should the approaching hyperlink be selected.

Furthermore, a switchover application may be used to control the switchover from the original session and content stream to a new session and control stream to which a selected hyperlink in the original content stream points. The switchover application may be downloaded from the original content server to the browser, the call processing server, or a service control means associated with the call processing server. The switchover application may be adapted to the applications required by the content with which it is associated.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1A:
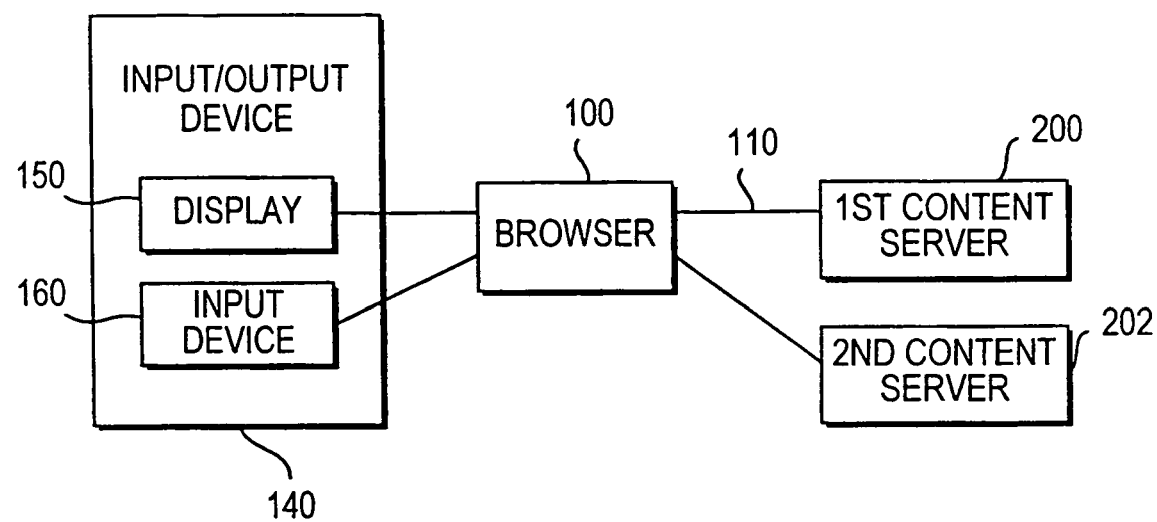
FIG. 1a is a basic schematic diagram showing a system for processing a time-dependent hyperlink according to the present invention.

Referring to FIG. 1a, a browser 100 is used with a user input/output device 140 including a display device 150 and an input device 160 such as, for example, a computer mouse and/or a keyboard. The browser 100 connects to a content server 200 to retrieve information from an electronic document in the content server 200 via a channel 110 and display the information to the user. The session between the browser 100 and the content server 200 is conducted over an IP network using a data transfer protocol such as, for example, a Real Time Transport Protocol (RTP) which separates the electronic document in media appropriate packets (i.e. a video frame) for transmission. The electronic document transmitted to the browser from the content server 200 may contain hyperlinks which link to other documents which may be in content server 200 or may be in other content servers. The link data is transmitted to the browser 100 using another protocol which includes more error checking, such as User Datagram Protocol/Internet Protocol (UDP/IP) or Transmission Control Protocol/Internet Protocol (TCP/IP). To select a hyperlink, the user operates the input device 160 to select the position in the electronic document at which the hyperlink is shown (i.e., the x, y coordinates on the user display). According to the invention, the electronic document in the content server 200 is a video and the hyperlinks are viewable objects in the video of the content server 200. Therefore, the position of the hyperlink also includes time as one of the coordinates. Content reference such as Uniform Resource Locator (URL) and/or session description information of the selected hyperlink is determined from the coordinates selected by the user. If for example, the hyperlink is linked to an electronic document in content server 202, the browser initiates a connection to a new session the electronic document in content server 202. To establish the new session, the new content server 202 must be contacted and a description of the session to be established and/or an identifier to specify the content requested (URL) must be delivered to the new content server 202. These steps may be performed by a Session Initiation Protocol (SIP). The description of the new session to be established may be described in a Session Description Protocol (SDP). The SDPs may be multicast via a well-known multicast address. A more detailed description of the RTP is found in H. Schulzrinne, S. Casner, R. Fredrick, and V. Jaconson, "RTP: a transport protocol for real-time applications," Request for Comments (Proposed Standard) 1889, Internet Engineering Task Force, January 1996, the entire contents of which are incorporated herein by reference. A more detailed description of SIP is found in DRAFT-IETF-MMUSIC-SIP at www.itf.org, the entire contents of which are incorporated herein by reference. Once the new content server is connected, the browser switches the user input/output device 140 to the new content server 202 and drops the connection to the content server 200.

Figure 1B:
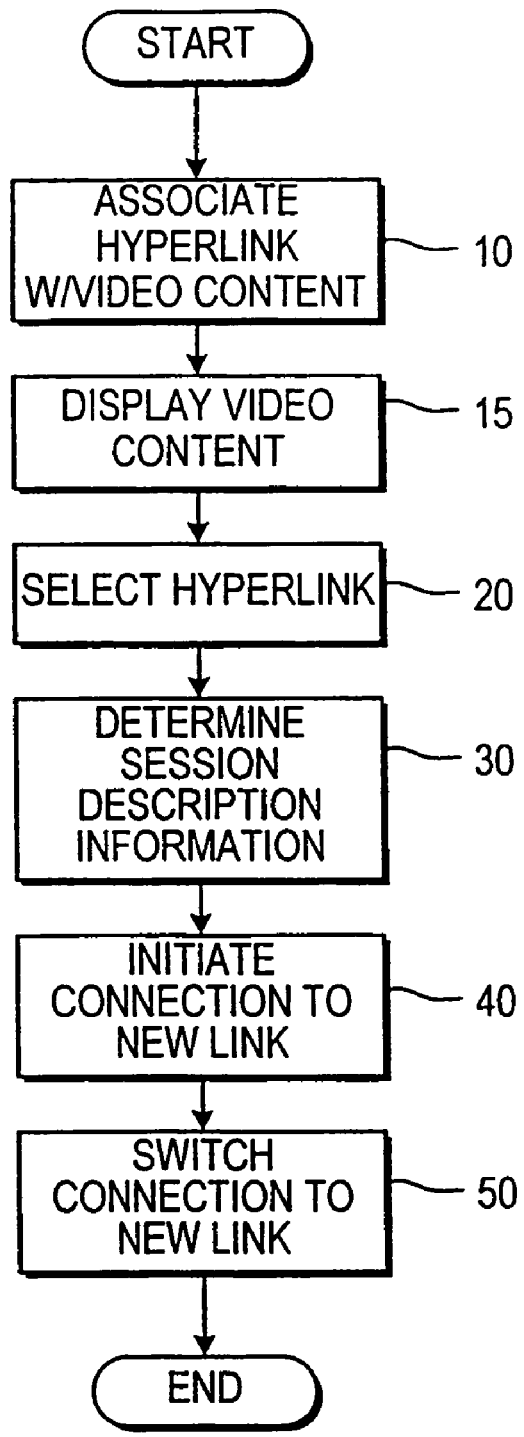
FIGS. 1b–1d are flow diagrams showing the general steps for selecting a hyperlink within a video and transferring control between servers.

Referring to FIG. 1b, the present invention includes the association of hyperlinks with the video as three dimensional objects where the dimension include the location on the screen (x, y) at which the hyperlink appears in the video and the time (t) during the playing of the video at which the hyperlink appears. It is also conceivable that the video may be three dimensional wherein the hyperlink has x, y, z, and t coordinates. The first step according to the invention is to associate the hyperlinks with a time and place in the video by coordinates, step 10. That is, each hyperlink is associated with coordinates indicating an area of a display and a time during the playing of a video at which the hyperlink appears at those coordinates. As a user is viewing the video via browser 100, the user may select one of the hyperlinks associated with the video, step 20. Upon selection of the hyperlink in the video by the user, a content reference for the selected hyperlink is determined based on the coordinates selected and the time of the selection, step 30. The content reference may include a Uniform Resource Locator (URL) to establish a session to the new content, session description information to reflect the characteristics of the new content, and the requirements for the browser. The URL may also include a time displacement from the start of the new content at which to start playing the new content. For example, the hyperlink may point to a portion, such as a scene, of a video which is located in the middle of the video. The URL may also specify a limited area in the picture frames from the time displacement onward. The content server may focus the picture to display only this limited area. Alternatively, the showing of the limited area in the picture frames and the focussing as specified by the URL may be performed by the browser itself, provided that the video coding of the stream from the content server has sufficient precision. However, the time displacement may also be indicated otherwise. The content reference may further comprise an SIP Call Processing Language (CPL) script that is sent in the session establishment signalling and used by call processing servers (described later) to assist in finding the required content. The CPL script may comprise contact instructions to alternate locations to be contacted to reach the required content. Similarly, the content reference may also comprise executable content that specifies how the selection of the hyperlink appears to the user. The content reference may include instructions to play a video clip at a hyperlink selection and control the establishment of the connection to the referred content. Finally, the content reference may specify whether a smooth switchover or immediate switchover is required and at which point in time the switchover should occur. After the content reference is determined, connection to the new session is initiated, step 40. When the connection to the new session is established, the browser 100 begins the new session and ends the previous session from which the new link was selected, i.e. the browser 100 switches over to the new session, step 50.

Regarding the dimension information (x-range, y-range, time) for the content, the x-range and y-range of a hyperlink at a given time window (i.e., time range) may be provided explicitly in the link stream. Alternatively, an algorithm may be used by the browser that selects an area on the screen based on visual characteristics of the image on the screen. The algorithm may comprise adaptive learning characteristics to enable it to select objects of frequently occurring types of patterns or persons. An algorithm that tracks a moving object in the video stream for a specified time may also be provided in the browser. The starting coordinates, starting time, and duration that the tracking should be performed may be specified to the tracking algorithm.

The algorithm may be built into the browser or may be downloaded to the browser when the browser initiates a session with the content that the algorithm is associated with. Similarly, the learning information may also be downloaded. The algorithm makes a decision whether an object has been pointed to by a pointer device based on pointing coordinates and time.

The existence of a link may be indicated to a viewer of the video in various ways. In one embodiment, the video content itself may contain information indicating visually to a user the existence of a hyperlink. In another embodiment, the browser may display a visual object pointing to the video content having the object having the associated hyperlink. In yet another embodiment, the browser may display the bounds of the object in accordance with the boundaries of the object provided explicitly in the link information contained in the link stream from the content server.

Figure 2A:
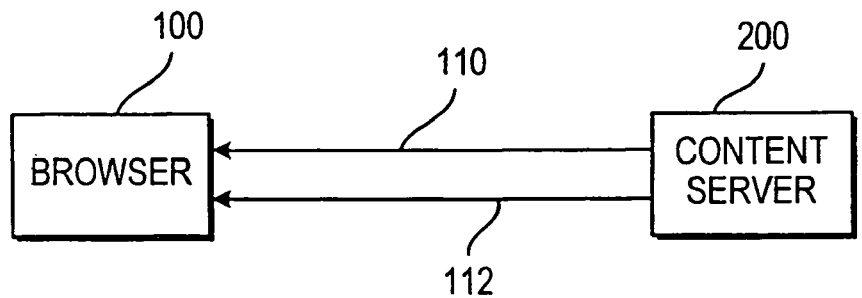
FIG. 2a is a schematic diagram showing a first embodiment connection between a content server and a video browser of the present invention in which the link information is transmitted to the video browser in a link stream.

Referring to FIG. 2a, an embodiment of the invention is shown in which a user views the video using the video browser 100 connected to the content server 200 which contains the video to be played. In this embodiment, the video and content reference information for the hyperlinks in the video are transmitted in two separate streams on respective first and second channels 110, 112. A link stream containing the content reference information for the hyperlinks is transmitted in parallel with the video to the video browser 100. The link stream includes the information required to establish the link, i.e., content reference and information sufficient to visualize the existence of the hyperlink. In this embodiment, the link stream provides the content reference for the hyperlinks that are presently viewable and selectable in the video. For example, the video may show a person walking from room to room and the hyperlinks may be associated with different furniture in each of the rooms. Therefore, the hyperlink for a chair in the kitchen is only selectable for the portion of time that the chair is displayed. Accordingly, the link stream contains content reference information for the hyperlink to the chair only for the duration of time that the chair is displayed.

When the user makes a selection in step 20 of FIG. 1b, the video browser 100 has all the information it needs to establish a connection, i.e. perform steps 30, 40, and 50 of FIG. 1b. Once the connection to the electronic document of the selected link is established, the browser 100 begins a session with the new link. The electronic document to which the hyperlink is linked may be any type of electronic document and does not have to be another video. The linked document could be a web page, a hypertext document, a video clip, and audio clip, or any other type of electronic document.

Figure 1C:
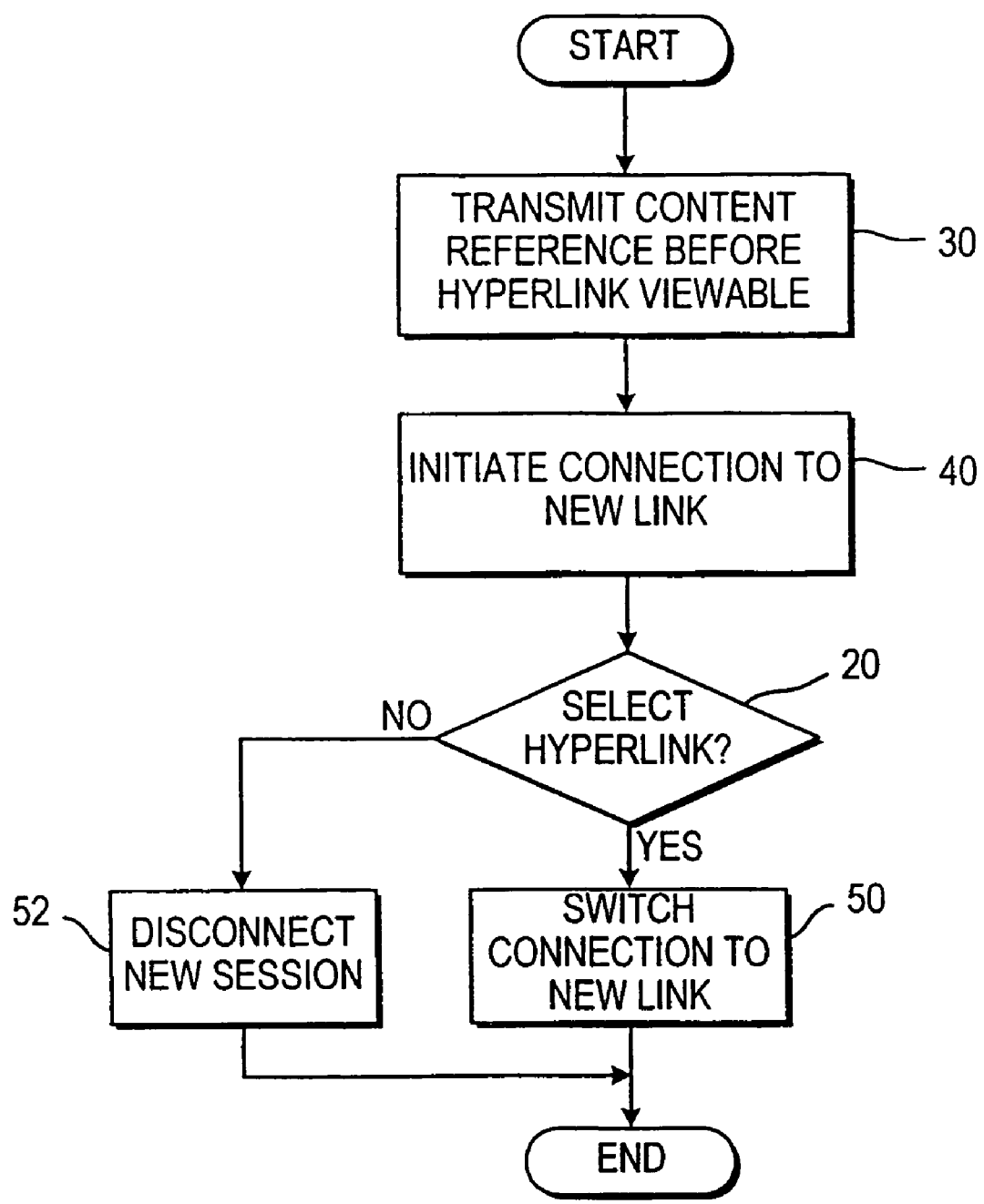

In an optional embodiment according to a flow diagram of FIG. 1c, the browser may initiate the establishment of a session towards the content pointed to by the link, i.e., the link session, before the user selects the hyperlink. In this embodiment, the content reference such as the address (i.e., URL) towards the content pointed to by the link and the link visualization information (coordinates and time ranges) for a hyperlink is transmitted to the browser 100 before the hyperlink is viewable in the video, step 30. The browser then initiates the establishment of a connection to that hyperlink on a separate channel while the original content is still being viewed by the user, step 40. Accordingly, when the user selects the hyperlink, step 22, a smooth switchover is achievable in step 50 because a parallel connection and optionally the content stream is already established by the time the hyperlink appears in the video and can be selected by the user. If the hyperlink is not selected, the browser merely drops the newly made connection and maintains the current session, step 52. This embodiment is costly and wastes bandwidth. However, it provides a smooth switchover from the current session to the new session when the hyperlink to the new session is selected. The smooth switchover is possible because the session establishment delay and the content loading delay at the content server are eliminated. Similarly, the delay of searching to the right position within the content, e.g. in a CD-ROM device, is eliminated. In this embodiment, the content reference information must be transmitted to the video browser 100 by the link stream in advance of the actual video which shows the hyperlink so that the advanced establishment of the link is possible. The advanced connection may be selectively made for those links which are likely to be selected, or other criteria.

Similarly, a smooth switchover can be used when returning to the original content from a selected content either when the content has reached its end or when a user explicitly decides to do so. When approaching the end of a branched-to content, the browser 100 starts the reestablishment of a session towards the original content from which the link was selected. The procedure for reestablishment of the original content is similar to the establishment of an upcoming link. In some cases, if the content reference indicates that the link content of a selected link is sufficiently short, the session to the original content server may be maintained at link selection. However, when the link content of the selected link reaches its end, it may be necessary to request the original content server to restart transmitting the content. If the original content server does not maintain content state, a time displacement at the branched-from link is indicated to it.

Figure 1D:
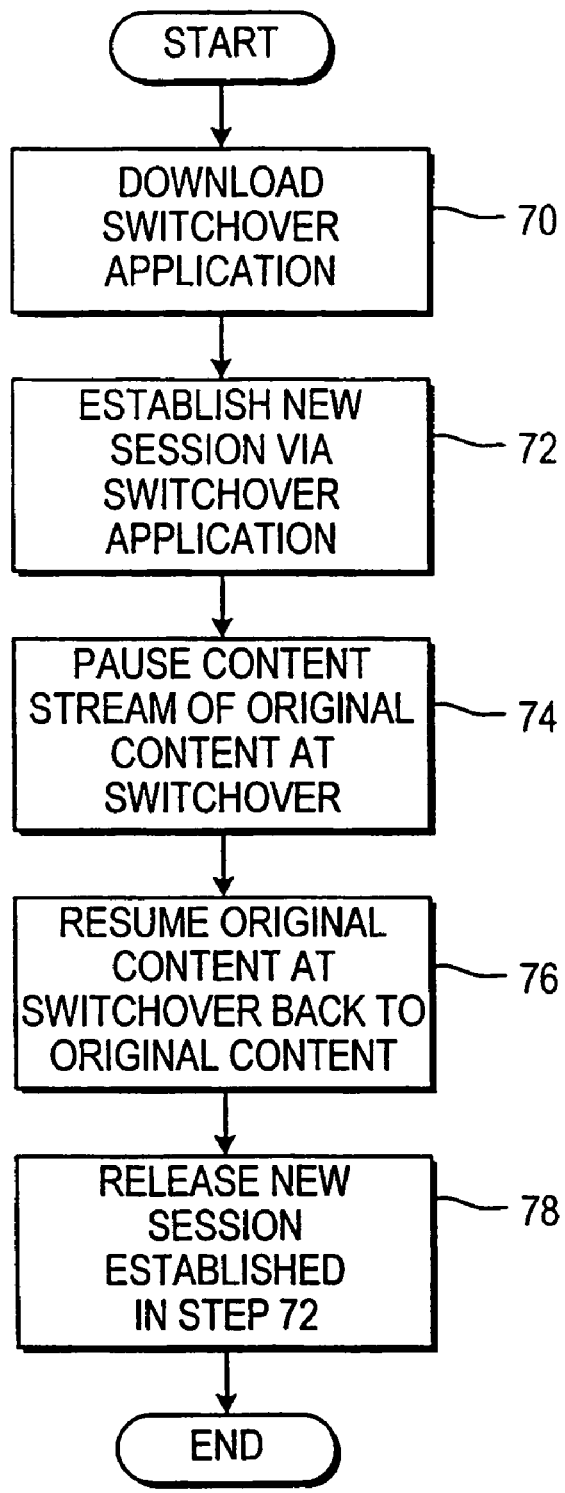
Figure 2B:
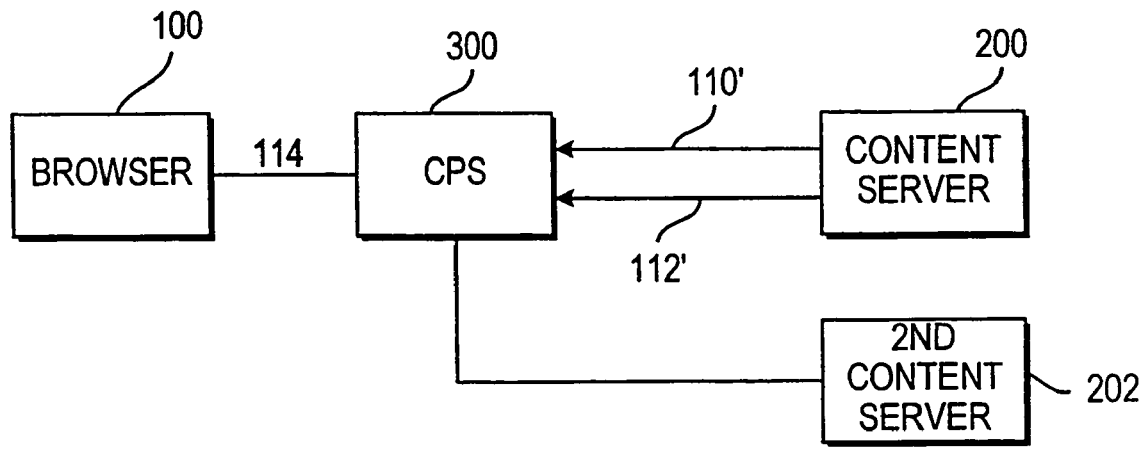
FIG. 2b is a schematic diagram of the connection of FIG. 2a showing an optional call processing server.

In a further optional embodiment shown in FIG. 2b, a call processing server 300 is arranged between the browser 100 and the content server 200. The parallel first and second transmission channels 110', 112' are arranged between the content server 200 and the call processing server 300. When the user selects a hyperlink, the coordinates and time of the selection are transmitted to the call processing server 300 from the browser 100. The call processing server 300 performs the steps 30 and 40 of FIG. 1b, thereby selecting the content reference and establishing the session, i.e., setting up a connection to a new content server 202 based on the coordinates and the time of the selection and initiating the connection to the new content server 202 to which the new link is connected, over a new channel 118. The call processing server 300 also establishes the new session in step 50 of FIG. 1*b* by dropping the old session from the first content server 200 and connecting the new content server 202 to the browser 100, step 50 of FIG. 1, when the connection to the new session is established. The call processing server 300 may establish this new session in advance of the selection of the new session by the user to enable a smooth transition. The benefit of using the call processing server 300 is that only one session is connected to the video browser 100 at the viewer terminal 140 at any one time, which may save bandwidth.

Figure 2C:
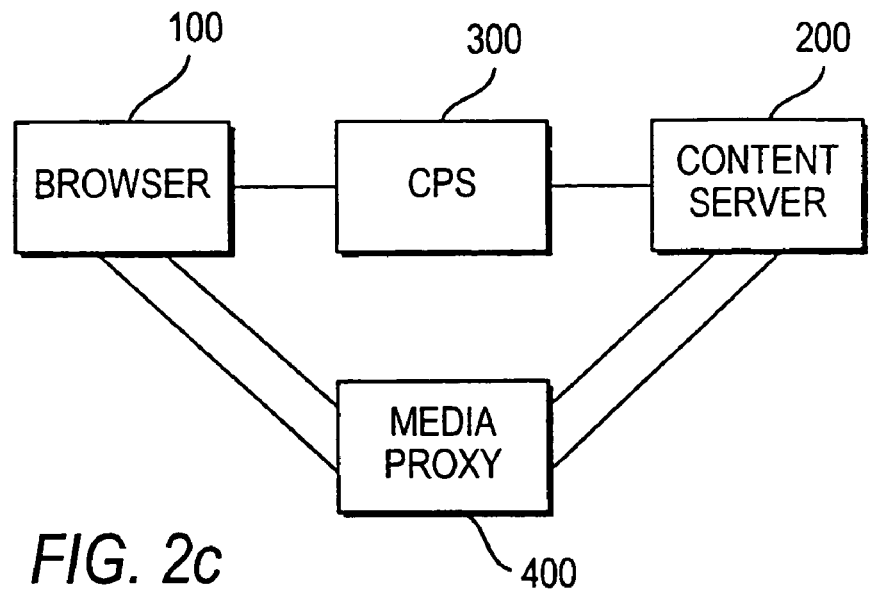
FIG. 2c is a schematic diagram of the connection of FIG. 2a showing an optional media proxy with the call processing server.

In yet a further embodiment shown in FIG. 2*c*, a media proxy 400 may optionally be attached to the CPS 300. In this embodiment, the control channels between the browser 100 and the content server 200 are connected via the CPS 300. However, the data channels carrying the individual media components are routed from the content server 200 to the browser 100 via the media proxy 400. On this embodiment, the CPS 300 instructs the media proxy 400 to perform connections on the data channels. The data channels may comprises a media mix including audio, video, and data streams. The different media can be added, dropped, or replaced dynamically during a call via instructions from the CPS 300. The media proxy 400 identifies the different types of media components from the multimedia stream and perform switching of the individual media components separately.

Figure 2D:
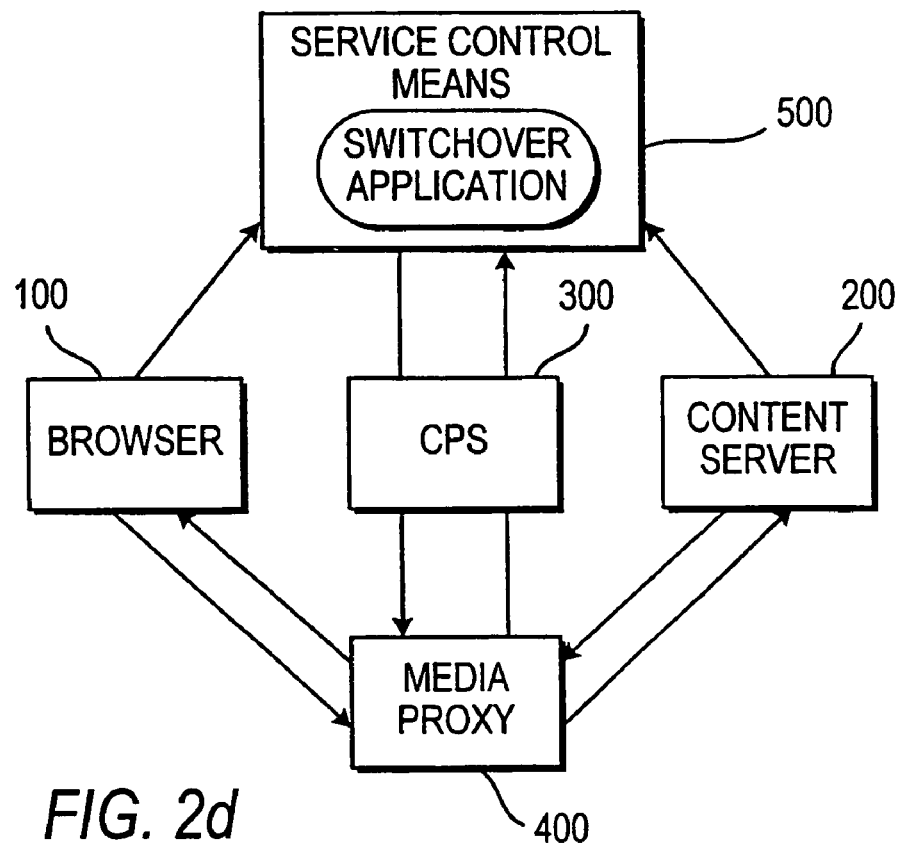
FIG. 2d is a schematic diagram of the connection of FIG. 2c showing an optional service control means connected to the call processing server.

In yet a further embodiment shown in FIG. 2*d*, a service control means 500 may be connected with the CPS 300. In this embodiment, control signals and the link stream are transmitted to the service control means 500 from the browser 100 and the content server 200. The data streams are transmitted via a media proxy 400. If the media proxy 400 is not used, the data stream is transmitted to the CPS 300 directly.

Each of the embodiments shown in FIGS. 2*a*–2*d* and discussed above may include the advanced connection of a link for a smooth switchover. Furthermore, a switchover application that performs the smooth switchover to a new session may optionally be used. The switchover application is a generic program for performing several tasks and may be responsible for one to many links associated with a video, i.e., the switchover application is associated with the video content and knows the links it is responsible for. The switchover application is stored in the content server with the video.

The switchover application may be downloaded (step 70, FIG. 1*d*) from the content server of the video to the browser 100 (FIG. 2*a*), the CPS 300 (FIGS. 2*b* and 2*c*), or to the service control means 500 (FIG. 2*d*). The switchover application is executed by the browser 100, CPS 300, or service control means 500. The switchover application is responsible for receiving and interpreting the link stream information. The switchover application may establish the sessions toward links selectable by a viewer of the video. A link selection by a user is indicated to the switchover application from the browser 100, and the switchover application hands control over from the current session to a new session. A particular switchover application may include any one or more of the following steps:

Downloading given contents at given points in time;

Playing contents at given points in time;

Checking content server availability;

Selecting from several content servers depending on server load status;

Requesting a content server to prepare a content for transmission (e.g., load from a secondary storage to a buffer in case of failure in one or more of the bulleted steps listed here);

Requesting a content server to start transmitting the prepared document;

Requesting a content server to start transmitting content from a given time displacement;

Requesting the downloading of a new switchover application from a content server for the content referred to by a selected link;

Establishing sessions to new content at given points in time;

Determining round trip delay between the browser and the content server and adjusting switchover times on the determination;

Determining permanent terminal or terminal location specific implications to general session establishment time and adjusting switchover schedules based on the determination (e.g., session establishment time overhead in a mobile terminal such as a wireless local area network);

Submitting received call processing language scripts to assist session establishment;

Performing procedures needed to join a multicast session (e.g. inform recipient address to be added to a multicast address expansion list and indicate multicasting content server about new receiving party);

Reserving network resources for a session under establishment or a link or data stream being resumed;

Freeing network resources for a session being cleared or a link or data stream being paused;

Performing video/audio content switchover at a given point in time;

Comparing link content reference information with user preference attributes and browser/network capabilities, in case of failure to satisfy the preference attributes (e.g., content cost, content categorization, content encoding, and decision not to visualize a link); and Cancelling the visualization of a hyperlink to the user in case of failure or erasing of the link from the link stream and/or in case of failure in any of the previous listed steps.

If a session of the selected link is sufficiently short, the switchover application may remain in control and may decide not to release the session toward the original video from which the link was selected as shown in the flow diagram of FIG. 1*d*. In this case, the switchover application may further include the following steps, in addition to the previous steps:

Establishing a new session toward the link content at a given point in time, step 72;

Pausing the video/audio content stream of the original content at switchover, step 74;

Resuming the video/audio content stream of the original content at switchover back to the original content, step 76; and Releasing the session toward the link content after switchover back to the original content, step 78.

Some of the above steps may be omitted or combined. Furthermore, a hyperlink may point to more than one new content to be connected one after the other. For example, when a hyperlink is selected, the browser may first be connected to a first new content such as a video clip. After the first new content finishes, the browser may then be connected to a second new content, so that the browser is connected to both the first content and then the second content in response to the selection of one hyperlink. The above described procedure steps may also be performed in the previous embodiments where the downloading of a switchover application is not used, but instead the functions of a switchover application are resident on the browser or call processing server.

The benefit of switchover applications is that they allow the procedures used prior to and after the link selection to vary from one link to another and therefore, can be tailored to the content they are associated with.

Figure 4:
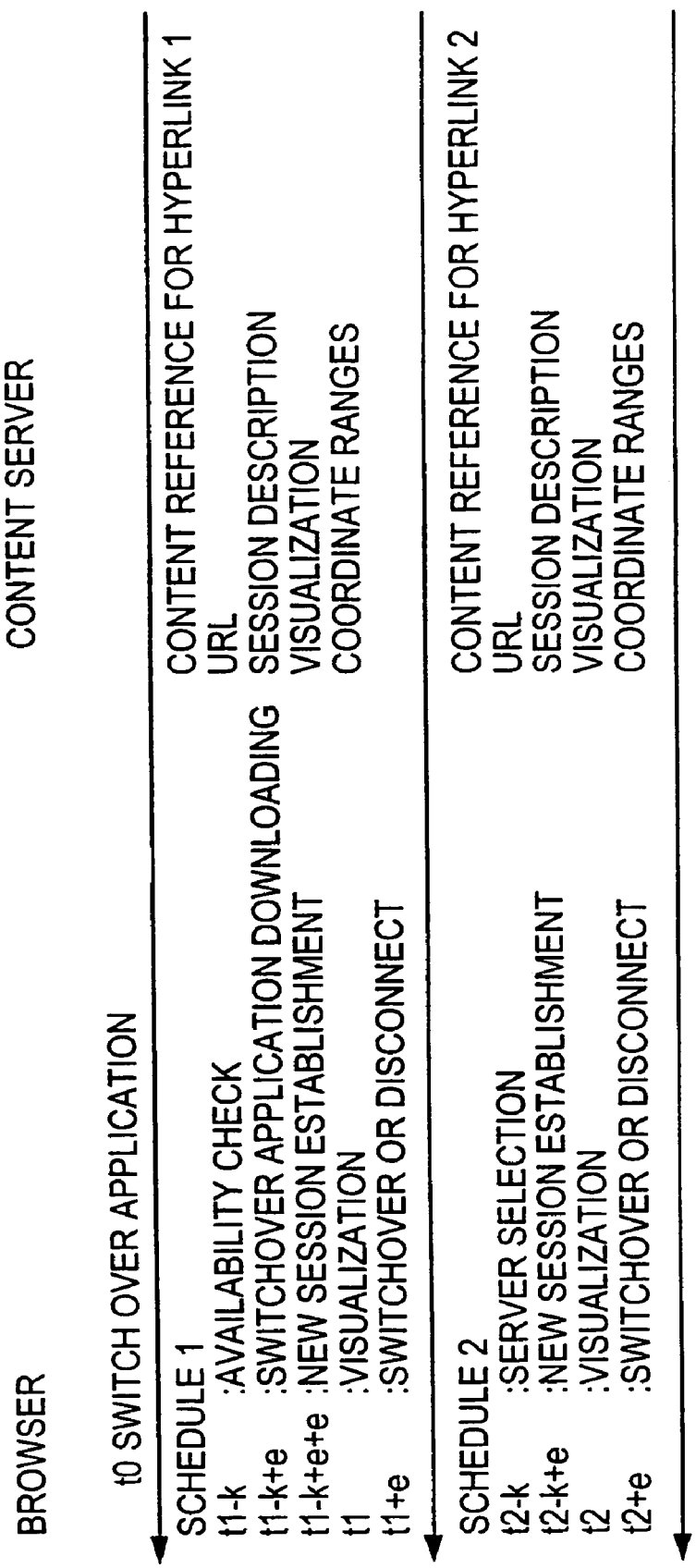
FIG. 4 is a timing diagram showing the transmission of a switchover application and content stream from a content server to a browser.

In one embodiment incorporating the switchover applications, the link streams includes one or more link content reference and switchover preparation schedules coupled with link visualization information. The switchover preparation schedules may be specified using simple ascii tag notation. The switchover application is arranged to interpret this notation. An example of a link stream schedule transmitted in the link stream is shown in FIG. 4. At time t0 a switchover application is downloaded to a browser. The link stream is transmitted to the browser in addition to the switchover application. A first switchover preparation schedule includes:

t1−k: availability check
t1−k+e: new switchover application downloading from URLx
t1−k+e+e: new session establishment;
t1: visualization of hyperlink to new session; and
t1+e: session switchover if hyperlink selected (or new session disconnection if no selection by user).

Furthermore, a second switchover preparation is transmitted after the first switchover preparation, the second switchover preparation including:

t2−k: server selection;
t2−k+e: new session establishment;
t2: visualization of hyperlink to new session; and
t2+e: switchover to new session if hyperlink is selected (or disconnection of new session if hyperlink is not selected).

The switchover preparation schedules are not necessarily fixed and can be adapted to specific environments by returning feedback information from the browsers to the content server pointed to by the selected link. While the new session to the content of the selected link is being established, the browser measures the time needed to establish the session. The time needed for session establishment may be may be calculated several ways. If the reply time from the sending of SIP invite message to receipt of an OK answer message from the content server includes the preparations for sending the content stream (i.e., loading of content from secondary storage from indicated time displacement onwards and memory allocation etc.), the reply time can be used to adjust the time in the switchover preparation schedule which indicates how much time before the visualization of the link, the link session must be established. If the reply time does not involve content stream preparation, the content stream preparation time must also be calculated and added to the session establishment time to determine the time indicating how much before the visualization of the link the link session must be established. Similarly, the round trip delay from the browser to the content server may be measured to determine how much earlier the request to start transmitting the prepared content must be issued.

The feedback information collected from the browsers can be used to adjust the times in the switchover preparation schedules presented in the link stream. In an additional embodiment, the switchover preparation schedules associated with the switchover application may also be made specific to different receivers by determining the network address prefixes for different browsers. Similarly, the browser may simply report failures to establish a link session and obtain the content requested. A difference between the session description information indicated in the content reference and the session description information indicated by the link content server may also be reported by the browser. This information may be used to correct the session description information in the original content server. Similarly any conflict between the attributes indicated in the content reference and attributes indicated by the new content server can be reported.

The second switchover preparation schedule shown in FIG. 4 does not specify that a new switchover application downloading is not required. This scenario may occur when the content referred to by the link at t2 is under the same administration as the original content. In this embodiment, the preparations needed for switchovers are known to the existing switchover application.

In another embodiment, the switchover application encapsulates the link stream. That is, the information related to the links (coordinates, content reference, and schedules) is contained within the switchover application. Therefore, this embodiment does not require that a link stream associated with the switchover applications are downloaded periodically.

In yet a further embodiment, a switchover application may be downloaded to the browser 100, CPS 300, or service control means 500 either prior to the transmission of the link stream and actual content or at a given time displacement from the start of the video. If the switchover application is downloaded prior to the transmission of the link stream and actual video, it may itself establish the multimedia session and request the transmission of the link stream. If the switchover application is downloaded at a given time displacement from the start of the video, the need for downloading may be indicated by the content server or it may be pushed by the content server to the browser 100, CPS 300, or service control means 500.

A given switchover application may be responsible for a limited set of links in the link stream. When a switchover application has processed all links in its responsibility, it may start downloading of another switchover application to take its place.

Similarly, links in the link stream may be assigned to different switchover applications. In this case, the several switchover applications may be active simultaneously at the browser 100, CPS 300, or service control means 500.

Switchover applications may be specific to a link, a set of links within a content, a content or a set of contents. Similarly, different switchover applications may be used in the same content.

Generally, because the user may navigate through several links, a history of old switchover applications is cached either in the browser or the proxy. Only those switchover applications which still have remaining unencountered links pending are cached. If the last link under the responsibility of a given switchover application has been selected or the old application is no longer available, the switchover application is downloaded when navigating back to the original content. At that point the original content server is contacted and provided with the time displacement from the beginning of the original content at which a link was selected. Alternatively, a link identifier is provided to the original content server. This information is used by the original content server to download a correct switchover application and to start playing video content stream at correct time displacements, i.e., return to the point in the original video content at which the selected link was selected. The content server includes a mapping from the time displacements and or indices to switchover applications.

An alternative to providing advanced connection, i.e., smooth switchover, for a hyperlink selected in step 20, the currently connected content server 200 may optionally provide a string of video clips to be played while a connection to the new session is being established. These video clips play while the new session is being established so that the viewer screen displays a coherent video during the transition to the new session. As is apparent, this option is not required if the advanced establishment of the new session is made as described above.

In another alternative to making an advance connection to an upcoming link, the video browser 100, the call processing server 300, or the service control means 500 may simply check the availability of an upcoming link. If the check reveals that the link is unavailable, the visual representation of the link will not be displayed. Also, the links displayed by the video may be dependent on prior criteria specified by the user. For example, only links which pertain to prior interest categories may be displayed. As another alternative, the display of links may be dependent on parental/employer blocking. The criteria may also include subscriber information, such as whether the user is a paid member for links which allow only subscribers to access the information, or other price information such that only sessions below a certain price are presented.

Figure 3:
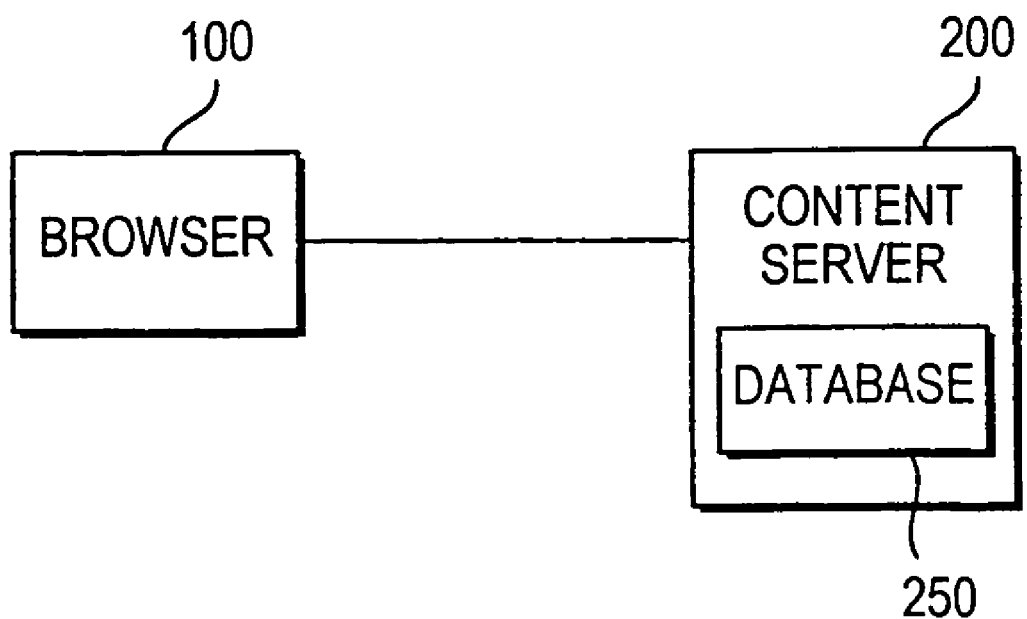
FIG. 3 is a schematic diagram showing a second embodiment connection between a content server and a video browser of the present invention in which the link information is stored in a link database in the content server.

Referring to FIG. 3, instead of transmitting the link data to the video browser 100 in parallel to the video, the link data including the session description information may be stored in a data base 250 in the content server 200. Information to visualize the existence of the link may transmitted with the video to the browser 100 as the video is playing, i.e., being displayed. The database 250 provides a mapping of time and coordinates to the content reference (address e.g., URL, session description information) of the hyperlinks. In this embodiment, when a link is selected by a user in step 20 of FIG. 1, the video browser 100 transmits the coordinates and time of the selection to the content server 200. The content server 200 retrieves the content reference from the database 250 based on these coordinates and time of the selection. The content server 200 may establish the session toward the new session itself (forwarding) or it can transmit the content reference for the selected link to the video browser 100 (redirection) so that the video browser 100 establishes the new session.

A smooth transition may be established in this embodiment by the content server 200 as follows. As a link to another session becomes available, the content server 200 establishes a connection for the video browser 100 so that it is available for a smooth switchover if the hyperlink for that session is selected by the user in step 20. The connection to the new session may then be redirected to the browser 100 by the content server 200 by merely switching the output to the browser 100.

As an alternative, instead of having the browser 100 query the database 250 in the content server 200 when a hyperlink is selected, all link content reference information in the database 250 for the video to be displayed may be downloaded from the content server 200 to the browser 100 at the start of the session with content server 200, before beginning of the video transmission from the content server 200 to the video browser 100. When a link is selected in step 20 of FIG. 1, the browser 100 contains the content reference information necessary to establish the connection in the downloaded file. The information is retrieved based on the coordinates and the time at which the hyperlink was selected by the user.

The invention is not limited by the embodiments described above which are presented as examples only but can be modified in various ways within the scope of protection defined by the appended patent claims.

I claim:

1. A procedure for using a time-dependent hyperlink in video, comprising the steps of:
   (a) associating content reference for at least one hyperlink with an object in a video by associating the content reference with coordinates at which the hyperlink appears in the video, wherein one of the coordinates includes time, such that the hyperlink follows the area on the screen in which the object associated with the hyperlink appears during the video;
   (b) transmitting the video from a first content server to a video browser of a user display;
   (c) selecting by the user a selected hyperlink in the video by selecting coordinates corresponding to the area and time at which the selected hyperlink appears in the video, whereby the user selects the selected hyperlink in real time while the video is being displayed by the video browser;
   (d) determining the content reference for a new session of the selected hyperlink based on the selected coordinates;
   (e) initiating a connection of the browser to the new session of the selected hyperlink; and
   (f) switching the connection of the browser from the first content server to the new session, wherein said steps (d) and (e) are performed prior to said step (c) of selecting such that said step of switching the connection is performed as a smooth switchover when the selected hyperlink is selected in said step (c).

2. The procedure of claim 1, wherein said step (b) further comprises transmitting a link stream to the browser in parallel to the video, the link stream including the content reference for the at least one hyperlink when the at least one hyperlink is displayed.

3. The procedure of claim 2, wherein said step (d) comprises determining, by the browser, the content reference based on the information received via the link stream and the coordinates selected in said step (c).

4. The procedure of claim 1, wherein said step (d) comprises looking up the content reference in a database in the current content server, the database including the content reference cross-referenced with the coordinates at which the at least one hyperlink for the content reference appears in the video.

5. The procedure of claim 1, further comprising the step of downloading a file from the current content server to the browser before performing said step (b), the file containing a database including the content reference cross-referenced with the coordinates at which the at least one hyperlink for the content reference appears in the video and said step (d) comprises looking up the content reference in the downloaded file.

6. The procedure of claim 1, wherein said step (e) further comprises initiating at a call processing server a connection to the new session of the selected hyperlink, the call processing server being arranged between the current content server and the browser.

7. The procedure of claim 1, wherein said steps (d), (e), and (f) are performed using a switchover application associated with the video in the current content server.

8. The procedure of claim 7, further comprising the step of downloading the switchover application containing information on the at least one hyperlink in the video being transmitted in said step (b).

9. The procedure of claim 8, wherein said step of downloading a switchover application is performed prior to said step (b), and said step (b) comprises establishing a multimedia session, by said switchover application, with the current content server and requesting transmission of a link stream including content reference for the at least one hyperlink.

10. The procedure of claim 8, wherein said step of downloading a switchover application is performed at a given time displacement from the start of the video in said step (b).

11. The procedure of claim 8, wherein said step of downloading a switchover application further comprises downloading a first switchover application and a second switchover application such that the first and second switchover applications are active simultaneously.

12. The procedure of claim 7, wherein the switchover application performs at least one of the following steps:
downloading given contents at given points in time;
playing contents at given points in time;
checking content server availability;
selecting from several content servers depending on server load status;
requesting the current content server to prepare a content for transmission;
requesting the current content server to start transmitting a prepared document;
requesting the current content server to start transmitting content from a given displacement;
requesting a downloading of a new switchover application for the content referred to by a link;
establishing a new session to new content at given points in time;
submitting received call processing language scripts to assist establishment of a new session;
determining round trip delay between the browser and the content server of the selected hyperlink and adjusting switchover times on the determination;
determining permanent terminal or terminal location specific implications to general session establishment time and adjusting switchover schedules based on the determination;
performing procedures needed to join a multicast session;
reserving network resources for a new session under establishment or a link or data stream being resumed;
freeing network resources for a new session being cleared or a link or data stream being paused;
performing video/audio content switchover at a given point in time;
comparing link descriptive information with user preference attributes and browser capabilities, in case of failure to satisfy the preference attributes; and
cancelling the visualization of the link to the user in case of failure.

13. The procedure of claim 12, wherein said step (f) comprises maintaining a session to the first content server and the switchover application performs the following steps:
establishing a new session toward the content of the selected hyperlink at a given point in time;
pausing the video/audio content stream of the original content at said step (f);
resuming the video/audio content stream of the original content at switchover back to the original content; and
releasing the new session toward the content of the selected hyperlink after switchover back to the original content.

14. The procedure of claim 13, wherein said step of resuming the video/audio content stream of the original content including resuming at the point in the original content at which the original content was paused.

15. The procedure of claim 13, wherein the switchover application caches a history of switchover applications.

16. The procedure of claim 3, wherein said steps (d), (e), and (f) are performed using a switchover application associated with the video in the first content server, said step of transmitting a link stream comprises transmitting a link stream including link selection and switchover preparation schedules, said switchover preparation schedules specified in ascii tag notation such that said switchover application performs the step of interpreting said ascii tag notation.

17. The procedure of claim 1, wherein said step (d) includes using an algorithm that determines the location of a hyperlink based on visual characteristics in the video.

18. The procedure of claim 1, wherein the browser performs at least one of the following steps:
downloading given contents at given points in time;
playing contents at given points in time;
checking content server availability;
selecting from several content servers depending on server load status;
requesting the current content server to prepare a content for transmission;
requesting the current content server to start transmitting a prepared document;
requesting the current content server to start transmitting content from a given displacement;
requesting a downloading of a new switchover application for the content referred to by a link;
establishing a new session to new content at given points in time;
submitting received call processing language scripts to assist establishment of a new session;
determining round trip delay between the browser and the content server of the selected hyperlink and adjusting switchover times on the determination;
determining permanent terminal or terminal location specific implications to general session establishment time and adjusting switchover schedules based on the determination;
performing procedures needed to join a multicast session;
reserving network resources for a new session under establishment or a link or data stream being resumed;
freeing network resources for a new session being cleared or a link or data stream being paused;
performing video/audio content switchover at a given point in time;
comparing link descriptive information with user preference attributes and browser capabilities, in case of failure to satisfy the preference attributes; and
cancelling the visualization of the link to the user in case of failure.

19. The procedure of claim 18, wherein said step (f) comprises maintaining a session to the first content server and the browser performs the following steps:
establishing a new session toward the link content at a given point in time;

pausing the video/audio content stream of the original content at said step (f);

resuming the video/audio content stream of the original content at switchover back to the original content; and releasing the new session toward the content of the selected hyperlink after switchover back to the original content.

20. The procedure of claim 19, wherein said step of resuming the video/audio content stream of the original content including resuming at the point in the original content at which the original content was paused.

21. The procedure of claim 19, wherein the browser caches a history of switchover applications.

22. The procedure of claim 1, wherein said step (b) comprises transmitting the video from a current content server to a video browser of a user display via a media proxy controlled by a call processing server.

23. The procedure of claim 22, further comprising the step of downloading a switchover application to said call processing server or a service control means connected to said call processing server, said switchover application containing information on links in the video being transmitted in said step (b).

24. The procedure of claim 23, wherein said step of downloading a switchover application is performed prior to said step (b), and said step (b) comprises establishing a multimedia session, by said switchover application, with the current content server and requesting transmission of a link stream including content reference for the at least one hyperlink.

25. The procedure of claim 23, wherein said step of downloading a switchover application is performed at a given time displacement from the start of the video in said step (b).

26. The procedure of claim 23, wherein said step of downloading a switchover application further comprises downloading a first switchover application and a second switchover application such that the first and second switchover applications are active simultaneously.

27. The procedure of claim 22, wherein the call processing server performs at least one of the following steps:
  downloading given contents at given points in time;
  playing contents at given points in time;
  checking content server availability;
  selecting from several content servers depending on server load status;
  requesting the current content server to prepare a content for transmission;
  requesting the current content server to start transmitting a prepared document;
  requesting the current content server to start transmitting content from a given displacement;
  requesting a downloading of a new switchover application for the content referred to by a link;
  establishing a new session to new content at given points in time;
  submitting received call processing language scripts to assist establishment of a new session;
  determining round trip delay between the browser and the content server of the selected hyperlink and adjusting switchover times on the determination;
  determining permanent terminal or terminal location specific implications to general session establishment time and adjusting switchover schedules based on the determination;
  performing procedures needed to join a multicast session;
  reserving network resources for a new session under establishment or a link or data stream being resumed;
  freeing network resources for a new session being cleared or a link or data stream being paused;
  performing video/audio content switchover at a given point in time;
  comparing link descriptive information with user preference attributes and browser capabilities, in case of failure to satisfy the preference attributes; and
  cancelling the visualization of the link to the user in case of failure.

28. The procedure of claim 27, wherein said step (f) comprises maintaining a session to the first content server and the call processing server performs the following steps:
  establishing a new session toward the content of the selected hyperlink at a given point in time;
  pausing the video/audio content stream of the original content at said step (f);
  resuming the video/audio content stream of the original content at switchover back to the original content; and
  releasing the new session toward the content of the selected hyperlink after switchover back to the original content.

29. The procedure of claim 28, wherein said step of resuming the video/audio content stream of the original content including resuming at the point in the original content at which the original content was paused.

30. The procedure of claim 28, wherein the call processing server caches a history of switchover applications.

31. The procedure of claim 1, further comprising the step of performing said steps (d), (e), and (f) for a first new session and performing said steps (d), (e), and (f) for a second new session after said first new session reaches an end, in response to said selected hyperlink.

32. A system for processing a time-dependent hyperlink in a video, comprising:
  a first content server comprising a video;
  a user input/output device comprising a display for displaying the video and an input device for selecting a position on said display;
  a browser arranged for connecting said user input/output device to said first content server;
  at least one hyperlink and content reference cross-referenced with coordinates indicating where the object associated with the at least one hyperlink appears in the video stored in said first content server, said coordinates including display position and time during the video such that the at least one hyperlink follows the area on the screen in which the object associated with the hyperlink appears during the video, and said content reference indicating a second content server comprising an electronic document to which the hyperlink is linked;
  means for determining when said hyperlink is selected by determining when coordinates at which the hyperlink appears in the video are selected while the video is being displayed on said display by said browser, wherein the selection of the hyperlink is in real time while the video is displayed; and
  means for switching over a connection of said browser from said first content server to said second content server for user access to said electronic document in said second content server when said means for determining determines that said hyperlink has been selected, said means for switching over comprising means for performing a smooth switchover including means for initiating a connection of said browser to said second content server before said user selection of said at least one hyperlink.

33. The system of claim 32, further comprising means for transmitting a link stream containing said content reference of said at least one hyperlink from said first content server to said browser on a first communication channel and transmitting said video from said first content server to said browser in parallel to said link stream on a second communication channel.

34. The system of claim 32, wherein said content server comprises a switchover application for performing a smooth switchover and said means for performing a smooth switchover comprises a means for using said switchover application.

35. The system of claim 34, further comprising means for downloading said switchover application to said browser before said video is displayed, and said switchover application comprising means for establishing a multimedia session with said first content server and for requesting transmission of a link stream including content reference for said at least one hyperlink from said first content server.

36. The system of claim 34, further comprising means for downloading said switchover application to said browser while said video is displayed.

37. The system of claim 34, wherein said browser further comprises means for running more than one of said switchover applications simultaneously.

38. The system of claim 33, wherein said content server comprises a switchover application for performing a smooth switchover and said means for performing a smooth switchover comprises a means for using said switchover application, and said link stream comprises link selection and switchover preparation schedules specified in ascii tag notation which is interpretable by said switchover application.

39. The system of claim 34, wherein switchover application comprises means for performing at least one of the following steps:
    downloading given contents of said first content server at given points in time;
    playing contents of said first content server at given points in time;
    checking availability of said second content server;
    selecting from several content servers depending on server load status;
    requesting said first content server to prepare a content for transmission;
    requesting said first content server to start transmitting a prepared document;
    requesting said first content server to start transmitting content from a given displacement;
    requesting a downloading of a new switchover application for a content referred to by a link;
    establishing a new session to new content at given points in time;
    submitting received call processing language scripts to assist establishment of a new session;
    determining round trip delay between the browser and the content server of the selected hyperlink and adjusting switchover times on the determination;
    determining permanent terminal or terminal location specific implications to general session establishment time and adjusting switchover schedules based on the determination;
    performing procedures needed to join a multicast session;
    reserving network resources for a new session under establishment or a link or data stream being resumed;
    freeing network resources for a new session being cleared or a link or data stream being paused;
    performing video/audio content switchover at a given point in time;
    comparing link descriptive information with user preference attributes and browser capabilities, in case of failure to satisfy the preference attributes; and
    cancelling the visualization of a link.

40. The system of claim 39, wherein said switchover application comprises means for maintaining a session to the first content server and comprising means for performing the following steps:
    establishing a new session toward the content of the selected hyperlink at a given point in time;
    pausing the video/audio content stream of the original content when said new session is established;
    resuming the video/audio content stream of the original content at switchover back to the original content; and
    releasing the new session toward the content of the selected hyperlink after switchover back to the original content.

41. The system of claim 40, wherein means for resuming the video/audio content stream of the original content includes means for resuming at the point in the original content at which the original content was paused.

42. The system of claim 40, wherein said switchover application comprises means for caching a history of switchover applications.

43. The system of claim 32, wherein said content server further comprises a link database.

44. The system of claim 43, further comprising means for downloading said link database to said browser.

45. The system of claim 43, wherein said means for determining when said hyperlink is selected comprises means for querying said link database.

46. The system of claim 32, further comprising a call processing server arranged between said browser and said first content server, said call processing server comprising said means for switching over a connection of said user input/output device from said first content server to said second content server.

47. The system of claim 46, wherein said means for performing a smooth switchover comprises means for initiating a connection of said browser to said second content server before said user selection said at least one hyperlink.

48. The system of claim 47, wherein said content server comprises a switchover application for performing a smooth switchover and said means for performing a smooth switchover comprises a means for using said switchover application.

49. The system of claim 48, further comprising means for downloading said switchover application to said browser before said video is displayed, and said switchover application comprising means for establishing a multimedia session with said first content server and for requesting transmission of a link stream including content reference for said at least one hyperlink from said first content server.

50. The system of claim 48, further comprising means for downloading said switchover application to said browser while said video is displayed.

51. The system of claim 48, wherein said browser further comprises means or running more than one of said switchover applications simultaneously.

52. The system of claim 33, wherein said content server comprises a switchover application and said means for performing a smooth switchover comprises a means for using said switchover application, and further comprising a call processing server arranged between said browser and said first content server, said call processing server comprising said means for switching over a connection of said user input/output device from said first content server to said second content server, said link stream comprises link selection and switchover preparation schedules specified in ascii tag notation which is interpretable by said switchover application.

53. The system of claim 48, wherein said content server comprises means for performing at least one of the following steps:
   downloading given contents of said first content server at given points in time;
   playing contents of said first content server at given points in time;
   checking availability of said second content server;
   selecting from several content servers depending on server load status;
   requesting said first content server to prepare a content for transmission;
   requesting said first content server to start transmitting a prepared document;
   requesting said first content server to start transmitting content from a given displacement;
   requesting a downloading of a new switchover application for a content referred to by a link;
   establishing a new session to new content at given points in time;
   submitting received call processing language scripts to assist establishment of a new session;
   determining round trip delay between the browser and the content server of the selected hyperlink and adjusting switchover times on the determination;
   determining permanent terminal or terminal location specific implications to general session establishment time and adjusting switchover schedules based on the determination;
   performing procedures needed to join a multicast session;
   reserving network resources for a new session under establishment or a link or data stream being resumed;
   freeing network resources for a new session being cleared or a link or data stream being paused;
   performing video/audio content switchover at a given point in time;
   comparing link descriptive information with user preference attributes and browser capabilities, in case of failure to satisfy the preference attributes; and
   cancelling the visualization of a link.

54. The system of claim 53, wherein said content server further comprises means for maintaining a session to the first content server and means for performing the following steps:
   establishing a new session toward the content of the selected hyperlink at a given point in time;
   pausing the video/audio content stream of the original content when said new session is established;
   resuming the video/audio content stream of the original content at switchover back to the original content; and
   releasing the new session toward the content of the selected hyperlink after switchover back to the original content.

55. The procedure of claim 54, wherein means for resuming the video/audio content stream of the original content includes means for resuming at the point in the original content at which the original content was paused.

56. The system of claim 54, wherein said content server comprises means for caching a history of sessions.

57. The system of claim 48, further comprising a media proxy connected with said call processing server operative for conducting media transmission between said first content server and said browser.

58. The system of claim 32, wherein said means for determining when a hyperlink is selected comprises an algorithm operative for determining the location of a hyperlink based on visual characteristics of the video.

59. The system of claim 32, wherein said browser comprises means for performing at least one of the following steps:
   downloading given contents of said first content server at given points in time;
   playing contents of said first content server at given points in time;
   checking availability of said second content server;
   selecting from several content servers depending on server load status;
   requesting said first content server to prepare a content for transmission;
   requesting said first content server to start transmitting a prepared document;
   requesting said first content server to start transmitting content from a given displacement;
   establishing a new session to a new content at given points in time;
   submitting received call processing language scripts to assist establishment of a new session;
   determining round trip delay between the browser and the content server of the selected hyperlink and adjusting switchover times on the determination;
   determining permanent terminal or terminal location specific implications to general session establishment time and adjusting switchover schedules based on the determination;
   performing procedures needed to join a multicast session;
   reserving network resources for a new session under establishment or a link or data stream being resumed;
   freeing network resources for a new session being cleared or a link or data stream being paused;
   performing video/audio content switchover at a given point in time;
   comparing link descriptive information with user preference attributes and browser capabilities, in case of failure to satisfy the preference attributes; and
   cancelling the visualization of a link.

60. The system of claim 59, wherein said browser further comprises means for maintaining a session to the first content server and comprising means for performing the following steps:
   establishing a new session toward the content of the selected hyperlink at a given point in time;
   pausing the video/audio content stream of the original content when said new session is established;
   resuming the video/audio content stream of the original content at switchover back to the original content; and
   releasing the new session toward the content of the selected hyperlink after switchover back to the original content.

61. The system of claim 60, wherein means for resuming the video/audio content stream of the original content includes means for resuming at the point in the original content at which the original content was paused.

62. The system of claim 60, wherein said content server comprises means for caching a history of sessions.

63. The system of claim 32, wherein a second content reference and a third content reference are both associated with said at least one hyperlink such that said means for switching over a connection further comprises means for switching over a connection of said browser from said second content reference to said third content reference of said at least one hyperlink after completion of said second content reference is completed.

64. A browser in a user input/output device comprising a display for displaying a video received from a first content server and an input device for selecting a position on the display, wherein at least one hyperlink and content reference cross-referenced with coordinates indicating where the object associated with the at least one hyperlink appears in the video stored in said first content server, said coordinates including display position and time during the video such that the at least one hyperlink follows the area on the screen in which the object associated with the hyperlink appears during the video, and said content reference indicating a second content server comprising an electronic document to which the hyperlink is linked, said browser comprising:

means for connecting the user input/output device to the first content server comprising the video;

means for initiating a connection of said browser to the second content server;

means for determining when the hyperlink is selected by determining when coordinates at which the hyperlink appears in the video are selected while the video is being displayed on said display, wherein the selection of the hyperlink is in real time while the video is displayed; and means for switching over a connection of said browser from said first content server to said second content server for user access to said electronic document in said second content server when said means for determining determines that said hyperlink has been selected, wherein said means for initiating is performed before user selection of said at least one hyperlink so that said means for switching over effects a smooth switchover from the first content server to the second content server.

* * * * *